United States Patent [19]
Zinn

[11] Patent Number: 5,355,300
[45] Date of Patent: Oct. 11, 1994

[54] VOLTAGE CONVERTER

[76] Inventor: James K. Zinn, Rte. 2, Box 1548, Amarillo, Tex. 79101

[21] Appl. No.: 85,840

[22] Filed: Jul. 6, 1993

[51] Int. Cl.5 .................... H02M 1/00; B23K 13/08
[52] U.S. Cl. ................................. 363/146; 219/482
[58] Field of Search ............... 363/15, 16, 144, 145, 363/146; 219/482, 488; 307/2, 26

[56] References Cited

U.S. PATENT DOCUMENTS

| | | | |
|---|---|---|---|
| 3,456,119 | 7/1969 | Schneider | 307/10 |
| 3,676,694 | 7/1972 | Schneider et al. | 307/10 R |
| 4,943,699 | 7/1990 | Thommes | 219/121.57 |
| 4,948,987 | 8/1990 | Weber | 307/36 |

*Primary Examiner*—Steven L. Stephan
*Assistant Examiner*—Matthew Nguyen

[57] ABSTRACT

A voltage converter is disclosed which converts an open circuit voltage from approximately 80 volts to about 120 volts DC. The voltage source which is converted is supplied by a welding machine. The converted voltage is used to power electric tools while drawing a relatively small amount of power from the welding machine. The converter includes a housing with two input leads for connection to the welding machine and an output receptacle in which electrical tools are plugged to receive power. Inside the housing are the components of the voltage conversion circuitry which latter is adapted to convert to an output voltage at the desired level. In an alternative arrangement, the circuit may produce an AC output voltage instead.

4 Claims, 5 Drawing Sheets

VOLTAGE CONVERTER

BACKGROUND OF THE INVENTION

1. Field of the Invention

The present invention relates generally to voltage converters, and more particularly, to a converter adapted to convert the power output by a welding machine to the level of a wall socket, i.e. approximately 120 volts.

2. Description of the Prior Art

Voltage converters generally are well known. For example, U.S. Pat. No. 4,486,646 dated Dec. 4, 1984 discloses an apparatus and method for generating a ramp voltage and using it as a control signal in the electrode circuit of an arc welder. U.S. Pat. No. 4,907,246 dated Mar. 6, 1990 describes a magnetically controlled variable transformer for controlling AC output power. U.S. Pat. No. 4,943,699 discloses a power supply for both arc welding and plasma cutting. U.S. Pat. No. 4,943,763 dated Jul. 24, 1990 discusses a ferro-resonant transformer having dual outputs which are electrically and magnetically isolated. This includes a core, primary coil and two pairs of secondary windings. Each secondary winding having an output terminal. Finally, U.S. Pat. No. 4,948,987 discloses a secondary power source having a voltage level stability substantially independent from otherwise influential changes in primary power circuit levels.

Frequently, it is desirable to use more than one electrical device at a work site where a welding machine is being used. Conventional welding machines are usually powered by a portable gasoline engine generator at a work or construction site. The voltage output of such generators although quite adequate to power the welding apparatus is usually insufficient to power a conventional electrical power tool, for example. The present invention eliminates the need for a separate source of electrical power for such ancillary electrical tools or other devices by enabling the latter to merely be plugged into the welding set and its source of power.

The voltage converter of the present invention is attached to the welding apparatus and provides a power source for other electrically powered tools within the workers' easy reach. This invention, therefore, eliminates the need for a separate electrical power source dedicated solely to the ancillary electrical tools. Other advantages of the present invention will become evident from the ensuing description.

SUMMARY OF THE INVENTION

To achieve the foregoing and other advantages, the present invention, briefly described, provides a voltage converter is disclosed which converts an open circuit voltage from approximately 80 volts to about 120 volts DC. The voltage source which is converted is supplied by a welding machine. The converted voltage is used to power electric tools while drawing a relatively small amount of power from the welding machine. The converter includes a housing with two input leads for connection to the welding machine and an output receptacle in which electrical tools are plugged to receive power. Inside the housing are the components of the voltage conversion circuitry, which latter is adapted to convert to an output voltage at the desired level. In an alternative arrangement, the circuit may produce an AC output voltage instead.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefor an object of the present invention to provide a new and improved voltage converter which has all of the advantages of the prior art and none of the disadvantages.

It is another object of the present invention to provide a new and improved voltage converter which may be easily and efficiently manufactured and marketed.

It is a further objective of the present invention to provide a new and improved voltage converter which is of durable and reliable construction.

An even further object of the present invention is to provide a new and improved voltage converter which is susceptible of a low cost of manufacture with regard to both materials and labor, and which accordingly is then susceptible of low prices of sale to the consuming public, thereby making such voltage converter available to the buying public.

Still yet a further object of the present invention is to provide a new and improved voltage converter which provides a suitable voltage for operating electrical machinery from the potential derived from the hot lead of a welder.

It is still a further object of the present invention to provide a new and improved voltage converter which connects to the hot lead of a welding machine while drawing a relatively small amount of power from the welding machine.

Still a further object of the present invention is to provide a new and improved voltage converter which allows for the use of standard electrical machinery at a worksite when a source of standard voltage electrical power (i.e. 120 volts) is not conveniently accessible.

Yet still a further object of the present invention is to provide a new and improved voltage converter which provides a suitable voltage for operating electrical machinery from the potential derived from the hot lead of a welder and wherein the converted output voltage is either DC or AC.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

Figure 1:
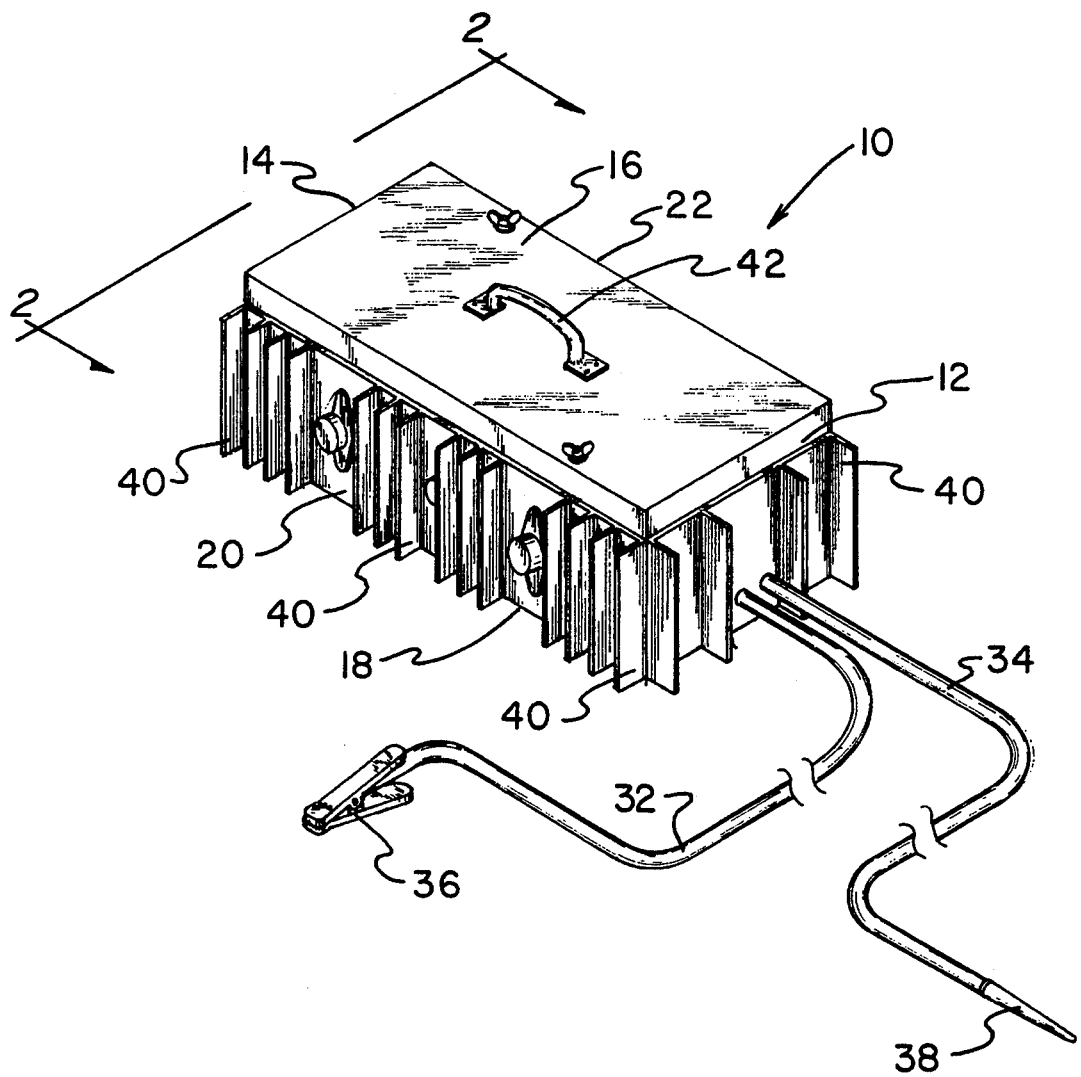
FIG. 1 is a perspective view showing the preferred embodiment of the voltage converter of the present invention.
Figure 2:
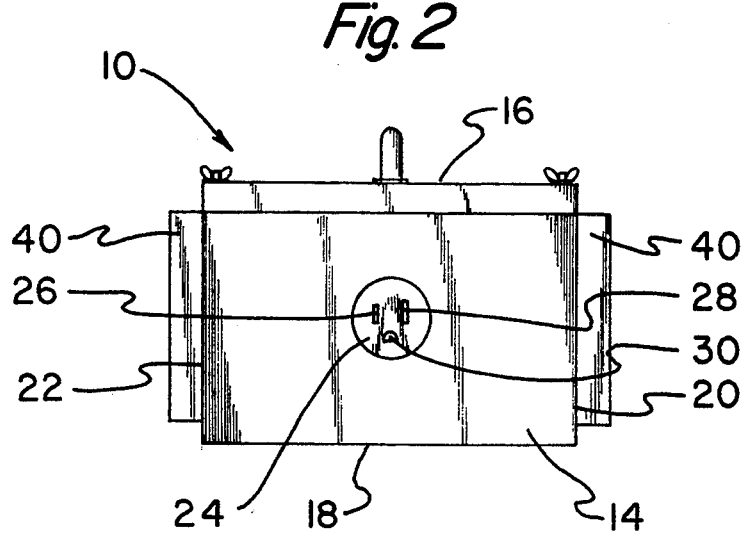
FIG. 2 is a view of the back wall of the voltage converter of FIG. 1.
Figure 3:
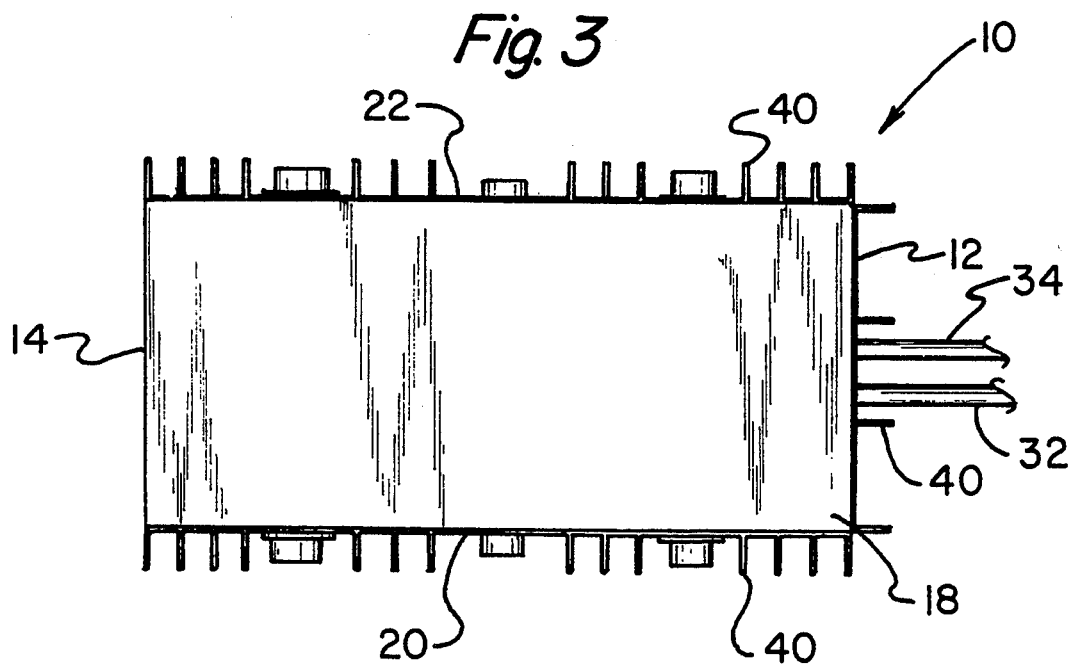
FIG. 3 is a view of the bottom side of the voltage converter of FIG. 1.
Figure 4:
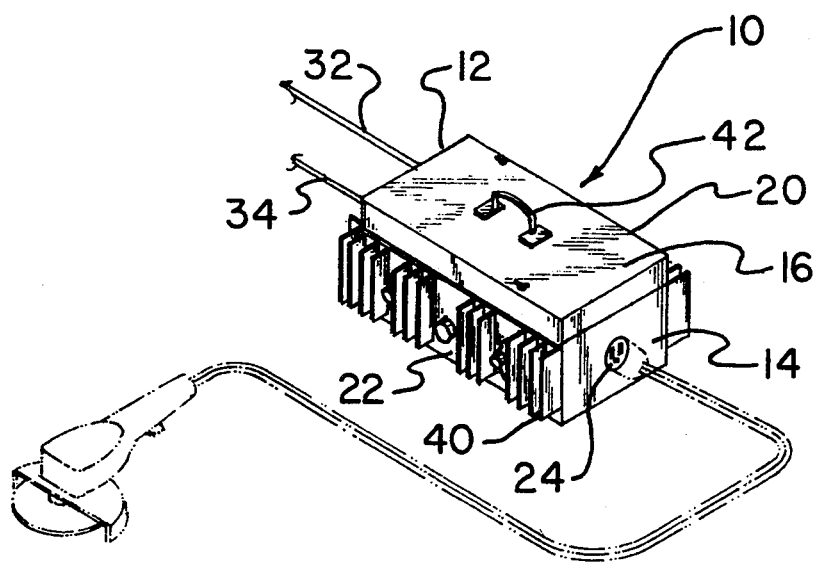
FIG. 4 is a perspective view of the voltage converter of FIG. 1 having a grinder or buffer connected to the back wall.

With reference now to the drawings, a new and improved voltage converter embodying the principles and concepts of the present invention will be described.

Turning initially to FIGS. 1-4, there is shown an exemplary embodiment of the voltage converter of the present invention generally designated by reference numeral 10. In its preferred form, the voltage converter 10 comprises generally a rectangularly shaped housing having front and rear opposed walls, 12 and 14 respectively; top and bottom opposed walls, 16 and 18 respectively; and right and left opposed sides, 20 and 22 respectively. The housing serves as an enclosure for a conventional electrical contact receptacle designated generally by reference numeral 24. The electrical contact receptacle 24 extends through a suitably sized and shaped opening in the rear wall 14 substantially as shown. Such an electrical contact receptacle is well known and the details of same form no part of the present invention. Each receptacle, in turn, has suitable openings 26, 28, and 30 to receive the blade contacts or prongs (not shown) of the ancillary device to which it is desired to supply electrical power. Such a device may comprise a conventional electrical power tool such as a grinder or buffer (see FIG. 4).

The housing also serves as an enclosure for a pair of input leads, a ground lead and a hot lead, each designated generally by reference numerals 32 and 34 respectively. Both the ground lead 32 and the hot lead 34 extend through suitably sized and shaped openings in the front wall 12 of the housing. The ground lead 32 is connected at an end extending from the front wall 12 of the housing to a clamp 36. The hot lead 34 is connected at an end extending from the front wall 12 of the housing to a stinger 38. The housing also serves as an enclosure for the voltage converter circuit to be described in further detail below in connection with FIG. 5.

Attached to the outside of the housing on the front and rear walls, 12 and 14, and right and left sides, 20 and 22, are heat sinks designated generally by the reference numeral 40.

Also attached to the top wall 16 of the housing is a handle 42 used for conveniently transporting the voltage converter to a destination for usage.

Figure 6:
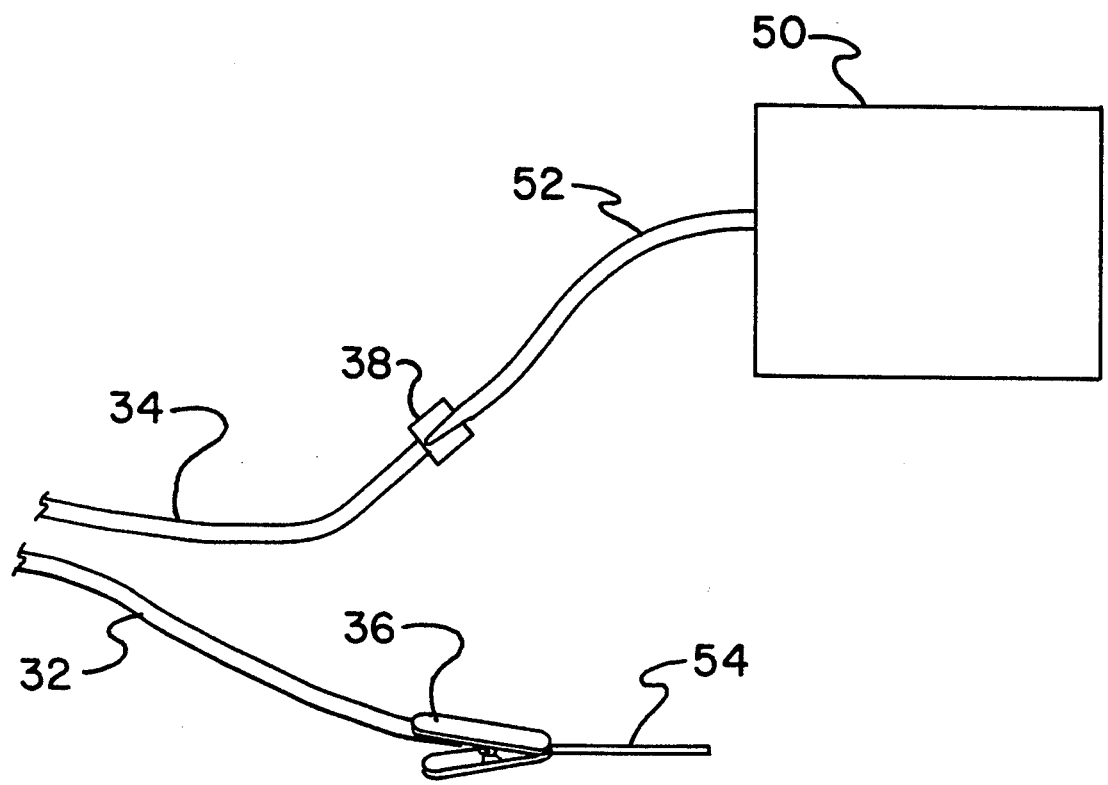
FIG. 6 is a perspective view of the voltage converter of FIG. 1 connected to a welding machine as a source for power.

FIG. 6 illustrates the connection between the voltage converter and an electric welder 50. Such a welder is well known and the details of same form no part of the present invention. The welder lead 52 is connected to the stinger 38 of the voltage converter. The clamp 36 on the ground lead 32 of the voltage converter is clamped to the metal to be welded 54.

Upon the connecting of the voltage converter and electric welder in the above manner an electrical circuit is formed including the power source for the welding machine (typically an on-site portable generator driven by a gasoline engine or the like), the welding machine, the voltage converter of the present invention, and any ancillary, electrical device connected to the voltage converter.

Figure 5:
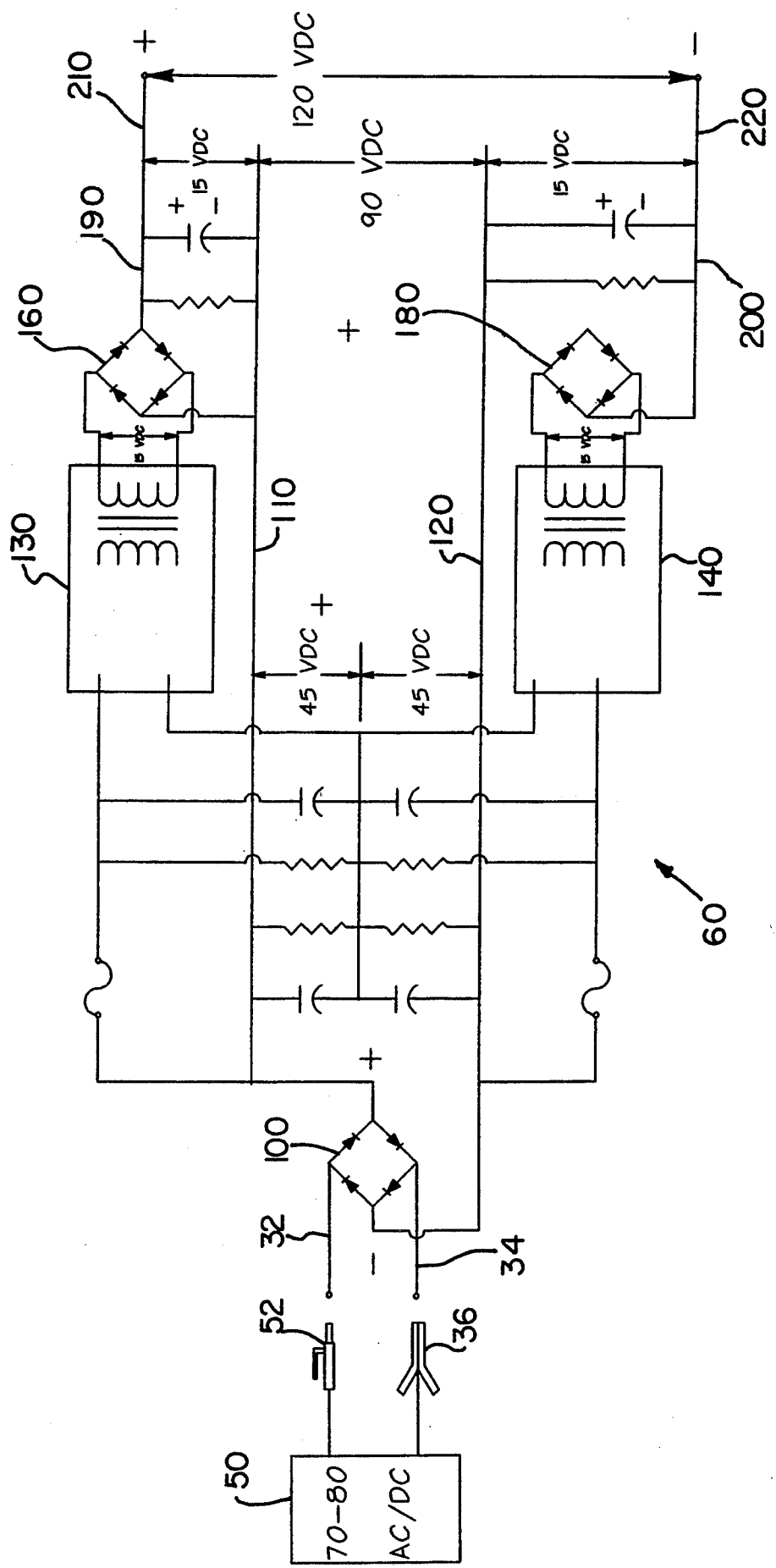
FIG. 5 is a circuit diagram of the voltage converter of FIG. 1.

The preferred embodiment of the voltage conversion circuit as illustrated in FIG. 5 will now be described. When a welding machine 50 is connected to the voltage converter 60, leads 32 and 34 are suitably connected across an input diode bridge rectifier 100 so that a positive and negative DC voltage are made available respectively on voltage busses 110 and 120. An RC filter network and fuse protection circuit are connected across the rectifier output as shown. The capacitors in the RC network will charge to peak voltage (about 90 volts if the input from the welder is about 70 to 80 volts AC or DC) and because of the values of the resistors in the RC filter netwok, a constant DC voltage of 45 volts of opposite polarity will be maintained along each buss 110 and 120. The RC network thus serves as a voltage divider connected in series between a pair of identical transistor power inverter transformers 130 and 140, respectively. Transformers 130 and 140 are such that with 45 volts DC being applied across their inputs, they each will produce a square wave output (AC) of about 15 volts which is applied across a respective diode rectifier bridge 160, 180 and RC filter circuit 190, 200 thereby being converted to a pair of outputs of 15 volts DC of opposite polarity. Since the outputs of busses 110, 120 and the inverters comprising transformers 130, 140, rectifiers 160 and 180, and RC filters 190, 200 are in series, the voltage across leads 210 and 220 will be about 120 volts DC. Leads 210 and 220 and a ground connection are suitably connected to output receptacle 24 on wall 14 of the housing of the voltage converter 10 of the present invention.

In operation, the hot lead of the welding machine is connected to the stinger of the voltage converter (lead 34). The clamp on the ground wire of the voltage converter is clamped to a piece of welding metal (lead 32). When the welding machine is powered, a potential of seventy to eight (70–80) volts AC or DC develops between the hot lead-stinger connection and the ground clamp. This voltage is insufficient to operate ancillary electrical devices requiring say, 120 volts of electrical power. The welding machine typically is powered by its own generator set driven by a gasoline powered internal combustion engine. However, when the welding machine is connected to the voltage converter of the present invention, electrical power at the desired level of about 120 volts DC is made available in the immediate vicinity of the welding machine to power an ancillary electrical device such as the grinder or buffing machine indicated by broken lines in FIG. 4; that is, the buffing machine power cord may be connected directly to the output receptacle 24 in sidewall 14 of housing 10 substantially as depicted.

Figure 7:
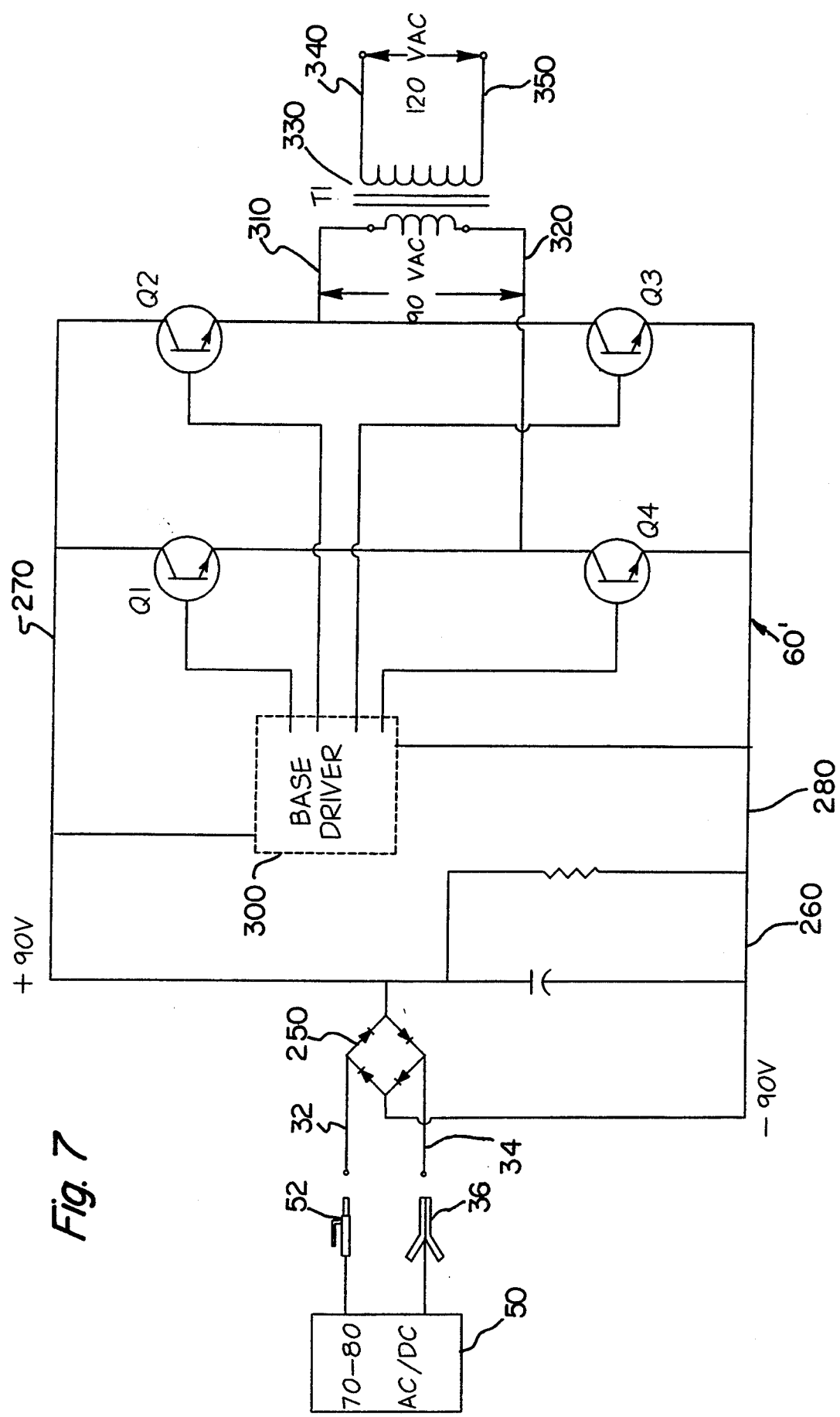
FIG. 7 is a circuit diagram of an alternatively preferred circuit adapted to be employed with the present invention.

In certain situations, it will be desired to have the output made available at receptacle 24 comprise an AC voltage of 120 volts particularly when variable speed ancillary electrical devices are to be operated in the vicinity of a welding machine. The alternatively preferred circuit of FIG. 7 may be used in lieu of the circuit of FIG. 5 to carry out this purpose. Thus, as shown in FIG. 7, when a welding machine 50 is connected to the alternatively preferred voltage converter circuit 60', leads 32 and 34 are suitably connected across an input diode bridge rectifier 250 having an RC filter network 260 such that a positive and negative DC voltage of equal magnitude are made available respectively on voltage busses 270 and 280. The capacitor in the RC network will charge to peak voltage (about 90 volts if the input from the welder is about 70 to 80 volts AC or DC) and maintain a constant voltage of 90 volts DC of opposite polarity along each buss 270 and 280. The positive voltage on buss 270 is applied to the collectors of switching transistors Q1 and Q2 whereas the negative voltage on buss 290 is applied to the emitters of identical switching transistors Q3 and Q4. A base driver 300 preferably in the form of a multivibrator or similar switch is clocked at 60 Hz. and drives the transistors at this rate. Transistors Q1 and Q3 are forward biased and transistors Q2 and Q4 are reverse biased for a sixtieth of a second and then reverse biased respectively for the next sixtieth of a second and this alternating sequence in bias configuration repeated indefinitely by the action of the base driver switch 300. As a result, the output of the transistor array is a square wave of approximately 90 volts. This output is applied at terminals 310, 320 to the input coil or primary winding of a conventional step-up transformer 330 whose output or secondary has sufficient windings or turns to produce an output across terminals 340 and 350 of about 120 volts AC. As in the circuit of FIG. 5, the output leads 340, 350 and a ground connection are suitably connected to output receptacle 24 on wall 14 of the housing of the voltage converter according to the present invention.

It will be appreciated that the components of the circuits of either FIG. 5 or FIG. 7 may be mounted on a circuit board or boards adapted to be suitably mounted within the enclosure formed by housing 10. The circuit boards may then be interchanged as desired. Alternatively, it is within the contemplation of the invention to provide both circuits within housing 10 and to provide a selector switch (not shown) suitably connected between the circuit boards and the input and output terminals of the converter with the selector switch being accessible from the housing exterior so that an operator may select which circuit is to be rendered operational between leads 32, 34 on the one hand and receptacle 24 on the other hand at any given moment by merely actuating the selector switch accordingly.

It is apparent from the above that the present invention accomplishes all of the objectives set forth by providing a new and improved voltage converter that is low in cost, relatively simple in design and operation, which advantageously allows for the use of standard electrical machinery at a worksite when a source of standard voltage electrical power (i.e. 120 volts) is not conveniently accessible, and which provides a suitable voltage for operating electrical machinery from the potential derived from the hot lead of a welder wherein the converted output voltage is either DC or AC.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from principles and concepts set forth herein. Hence, the proper scope of the present invention should be determined only by the broadest interpretation of the appended claims so as encompass all such modification sand equivalents.

What is claimed as being new and desired to be protected by Letters Patent of the United States is as follows:

1. A new and improved voltage converter adapted for converting the voltage output of a welding machine to a level useful for operating standard ancillary electrical devices comprising:

a housing, said housing having an electrical receptacle contact assembly extending from a first side of the housing;

a stinger handle extending from a second side of the housing;

a ground clip extending from the second side of the housing; and voltage converter circuit means enclosed in said housing for converting a first voltage obtained from a welding machine and connected across said stinger handle and said ground clip to a second voltage made available at said electrical receptacle contact assembly, wherein said voltage converter circuit means comprises an input rectifier having an RC filter network connected across the output thereof, said filter network serving as a voltage dividing network being connected in series with first and second transistorized power inverters so that the output of said inverters are equal DC voltages of opposite polarity, said first and second power inverters being connected respectively to first and second output rectifiers, said first and second output rectifiers being connected in series with said RC filter network wherein said receptacle is connected across said first and second output rectifiers and said voltage dividing network to produce a DC output having a magnitude equal to the sum of the voltage output of said dividing network and said first and second output rectifiers.

2. The invention of claim 1 wherein said first voltage comprises an AC or DC voltage in the range of b 70 to 80 volts, and said second voltage comprises a DC voltage of about 120 volts.

3. A new and improved voltage converter adapted for converting the voltage output of a welding machine to a level useful for operating standard ancillary electrical devices comprising:

a housing, said housing having an electrical receptacle contact assembly extending from a first side of the housing;

a stinger handle extending from a second side of the housing;

a ground clip extending from the second side of the housing; and voltage converter circuit means enclosed in said housing for converting a first voltage obtained from a welding machine and connected across said stinger handle and said ground clip to a second voltage made available at said electrical receptacle contact assembly, wherein said voltage converter circuit means comprises an input rectifier having an RC filter network connected across the output thereof, the output of said rectifier and said filter network being applied across first, second, third and fourth switching transistors, the output of said transistors being controlled by a biasing switch connected between said transistors and said input rectifier and filter network whereby the output of said transistors comprises a square wave at a frequency determined by the clock rate of said biasing switch, said square wave output being applied across the primary winding of step-up transformer, wherein said secondary winding of said transformer is connected to said receptacle.

4. The invention of claim 3 wherein said first voltage comprises an AC or DC voltage in the range of 70 to 80 volts, and said second voltage comprises an AC voltage of about 120 volts.

* * * * *